United States Patent [19]

Langen

[11] 4,122,939
[45] Oct. 31, 1978

[54] LOAD TRANSFER MECHANISM FOR PACKAGING MACHINE

[75] Inventor: Marinus J. M. Langen, Rexdale, Canada

[73] Assignee: H. J. Langen & Sons Ltd., Rexdale, Canada

[21] Appl. No.: 838,983

[22] Filed: Oct. 3, 1977

Related U.S. Application Data

[60] Continuation of Ser. No. 663,092, Mar. 2, 1976, abandoned, which is a continuation of Ser. No. 543,023, Jan. 22, 1975, abandoned, which is a division of Ser. No. 434,043, Jan. 17, 1974, Pat. No. 3,879,920.

[51] Int. Cl.$^2$ ............................................. B65G 19/02
[52] U.S. Cl. .................................... 198/482; 198/696; 198/796; 221/218
[58] Field of Search ............... 198/482, 696, 725, 796; 221/77, 78, 84, 85, 218, 219, 253

[56] References Cited

U.S. PATENT DOCUMENTS

| | | | |
|---|---|---|---|
| 2,570,516 | 10/1951 | Bowman | 221/253 |
| 2,927,680 | 3/1960 | Shappell | 198/502 |
| 2,993,622 | 7/1961 | Mumma | 221/218 X |
| 3,333,396 | 8/1967 | Paal et al. | 53/252 |
| 3,821,874 | 7/1974 | Jones | 53/252 X |

Primary Examiner—Stanley H. Tollberg
Assistant Examiner—Francis J. Bartuska
Attorney, Agent, or Firm—Fetherstonhaugh & Co.

[57] ABSTRACT

A packaging machine in which the shipper package is formed from a carton blank which is wrapped around the article to be shipped. The packaging machine includes a loading station having a loading mechanism for loading an article into each compartment as the compartments move continuously through the loading station. The loading mechanism includes a loading platform disposed above the path of travel of the article receiving compartments and wiper blades mounted for movement along the loading platform in the direction of travel of the compartments to remove an article deposited on the loading platform and to deposit it in a compartment as the compartment moves out from under the loading platform. A wrapping station is provided wherein the article receiving compartments are moved longitudinally through the wrapping station on a conveyor and are moved laterally of the conveyor so as to project over an edge of the conveyor when passing through the wrapping station. A carton blank locating mechanisms also provide for stripping a carton blank from a stack of knocked down blanks, partially folding the blank and locating the blank in the partial folded condition in the path of travel of the article receiving compartment. Detectors are provided for detecting the presence or absence of an article in the article receiving compartments after the loading station and for detecting the presence or absence of a wrapper after the wrapping station so as to prevent the formation of a carton without any contents located therein and to prevent the discharge of the contents from the article receiving compartment into the same receiver which receives the correctly wrapped packages.

1 Claim, 16 Drawing Figures

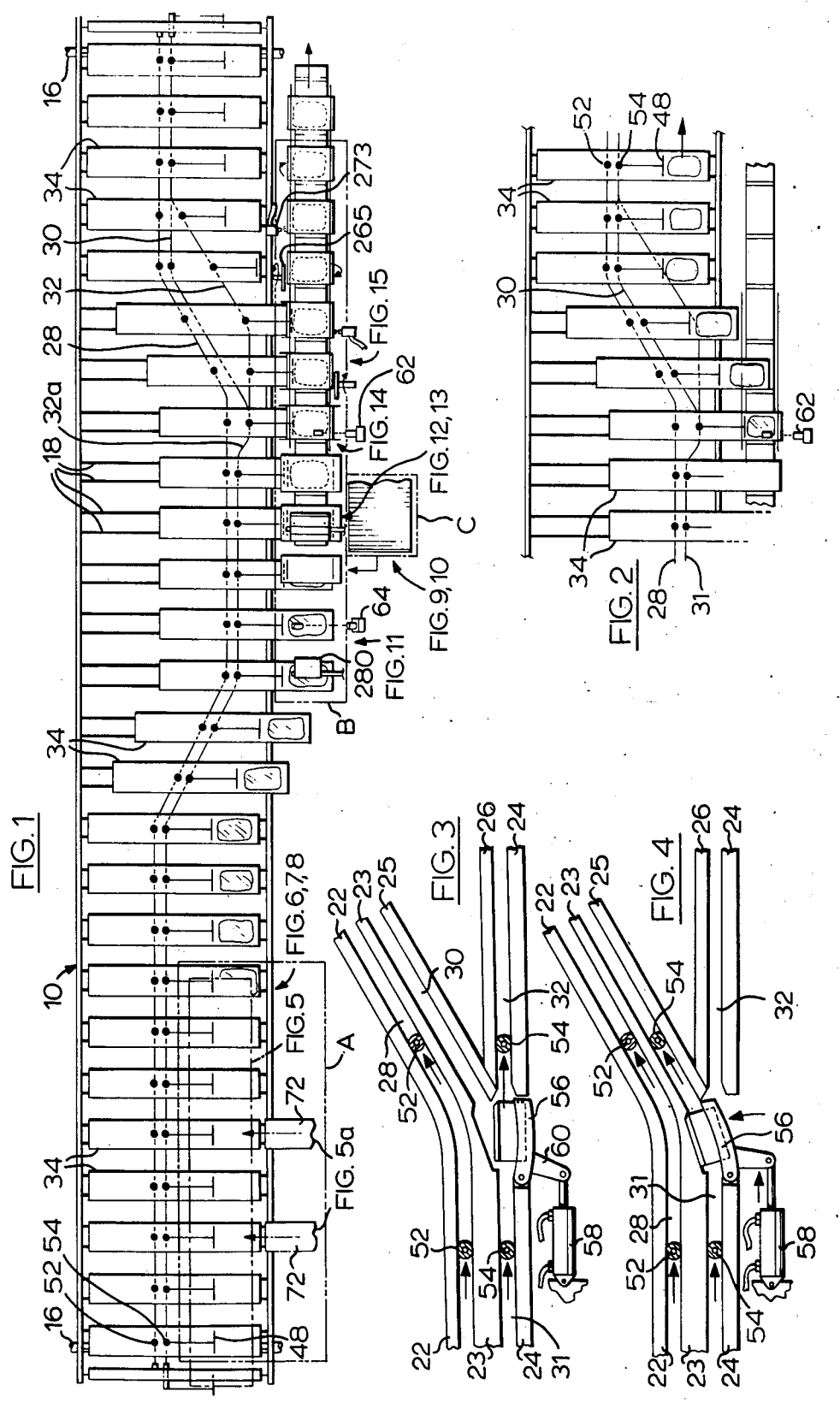

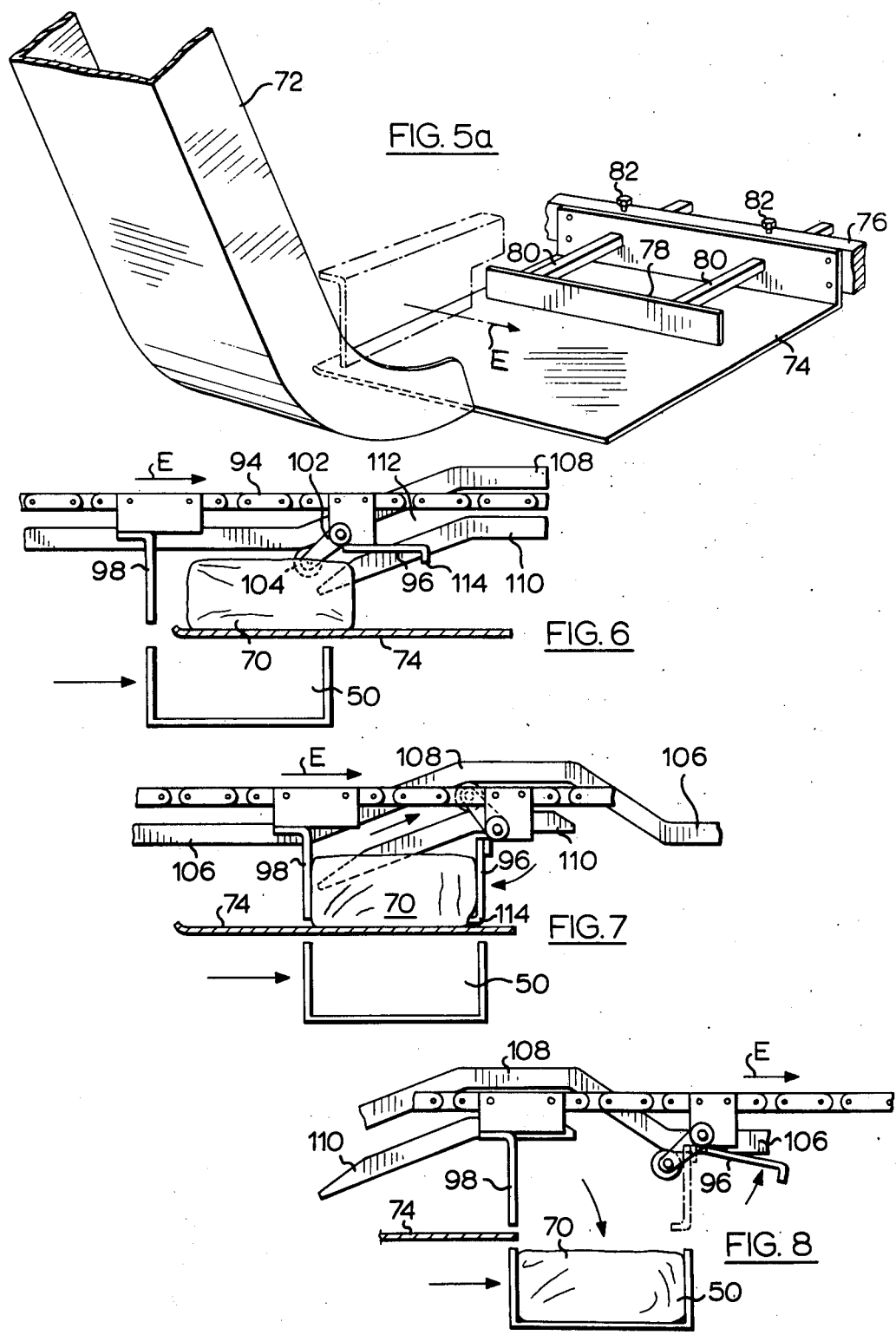

LOAD TRANSFER MECHANISM FOR PACKAGING MACHINE

This application is a continuation of Ser. No. 663,092, filed Mar. 2, 1976, now abandoned; which is a continuation of Ser. No. 543,023, filed Jan. 22, 1975, now abandoned; which is a division of Ser. No. 434,043, filed Jan. 17, 1974, now U.S. Pat. No. 3,879,920.

FIELD OF INVENTION

This invention relates to packaging machines. In particular, this invention relates to a packaging machine for packaging articles in cartons formed from wrap-around carton blanks.

PRIOR ART

It is common practice to pre-form carton blanks into the form of a partially assembled container which is opened by the packaging machinery to receive the article to be packaged therein. In this process, the carton is partially assembled by the carton manufacturer and shipped to the user in the partially assembled condition. Cartons in the knocked down partially assembled form are considerably more bulky than carton blanks in a fully knocked down configuration. It follows that the storage space required for the partially assembled containers is substantial. In addition, a large dispenser mechansim must be provided for the partially assembled knocked down cartons in the packaging machine.

A further difficulty which is experienced with machines for use in loading partially assembled cartons is that a complex mechanism is required to effect the opening of the carton from its knocked down configuration to receive the article which is to be packaged therein. Considerable difficulty has been experienced in attempting to provide a mechanism of this type which will reliably operate to open cartons from their knocked down configuration.

Difficulty is also experienced in attempting to insert the product into the open partially assembled cartons.

SUMMARY OF INVENTION

The present invention overcomes the difficulties of the prior art described above by providing a packaging machine in which the shipper package is formed from a carton blank which the machine of the present invention wraps around the article which is to be shipped.

According to an embodiment of the present invention, the packaging machine consists of a carton wrapping station, a first conveyor having a longitudinally extending marginal edge spaced laterally from the wrapping station, a plurality of article receiving compartments forming means mounted on the first conveyor for movement therewith in the longitudinal direction of travel of the first conveyor. Means is also provided for moving the compartment forming means laterally of the first conveyor means into and out of the wrapping station as the compartment forming means moves in the longitudinal direction of travel of the conveyor. The machine also includes means for locating a carton blank in the wrapping station in advance of each compartment forming member and means for wrapping the carton forming blanks about each compartment forming member and the article located therein as it moves through the wrapping station to form a wrapped sleeve. The machine also includes discharge means for discharging an article and its wrapper from the compartment forming members at the output end of the wrapping station.

According to a further embodiment of the present invention, the packaging machine includes a loading station having a loading mechanism for loading an article into each compartment as the compartments move continuously through the loading station. The mechanism includes a loading platform disposed above the path of travel of the article receiving compartments. The platform has a length in the direction of travel of the compartments which is greater than the length of a compartment in the direction of travel of the compartment. Dispenser means is provided for dispensing an article one at a time onto said platform. Wiper blade means is disposed above and mounted for movement along said loading platform in the direction of travel of said compartments. The movement of the wiper blade means is synchronized with respect to the movement of the compartment to remove an article deposited on the loading platform and to deposit the article in the compartment as the compartment moves out from under the loading platform.

According to a still further embodiment of the present invention, the wrapping mechanism which is disposed in the wrapping station includes a stripper mechanism for removing a knocked down blank from a carton blank storage station and delivering a blank in a partially folded configuration into the wrapping path of the article receiving compartment forming members and folding means for folding the partially folded blank in to a sleeve configuration about the carton folding receiving compartment forming members as the article receiving compartment forming members move through the wrapping station.

PREFERRED EMBODIMENT

The invention will be more clearly understood with reference to the following detailed specification read in conjunction with the drawings wherein FIG. 1 is a diagrammatic plan view of a packaging machine according to an embodiment of the present invention;

FIG. 2 is a diagrammmatic plan view of the output end of wrapping station illustrating a different condition to that illustrated in FIG. 1;

FIG. 3 is a plan view of a switching mechanism which is located at the output end of the wrapping station for selectively guiding the discharge mechanism;

FIG. 4 is a plan view similar to FIG. 3 showing the switching mechanism in a second position;

FIG. 5a is a detailed view of the loading platform of FIG. 5 which is partially obscured in the illustration of FIG. 5;

FIG. 6 is an end view illustrating the first stage in the location of the article on the loading platform;

FIG. 7 is a view similar to FIG. 6 showing a further stage in the location of the article in the loading platform;

FIG. 8 is a view similar to FIG. 7 showing the positioning of the article within the article receiving compartment;

With reference to FIG. 1 of the drawings, it will be seen that the apparatus of the present invention incorporates a loading station A in which the articles which are to be wrapped are loaded into compartments, a wrapping station B in which a blank is wrapped around the article which is to be packaged, and a combination stripper and transfer station C in which a blank is stripped from a stack of knocked down blanks and transferred to the wrapping station.

Figure 5:
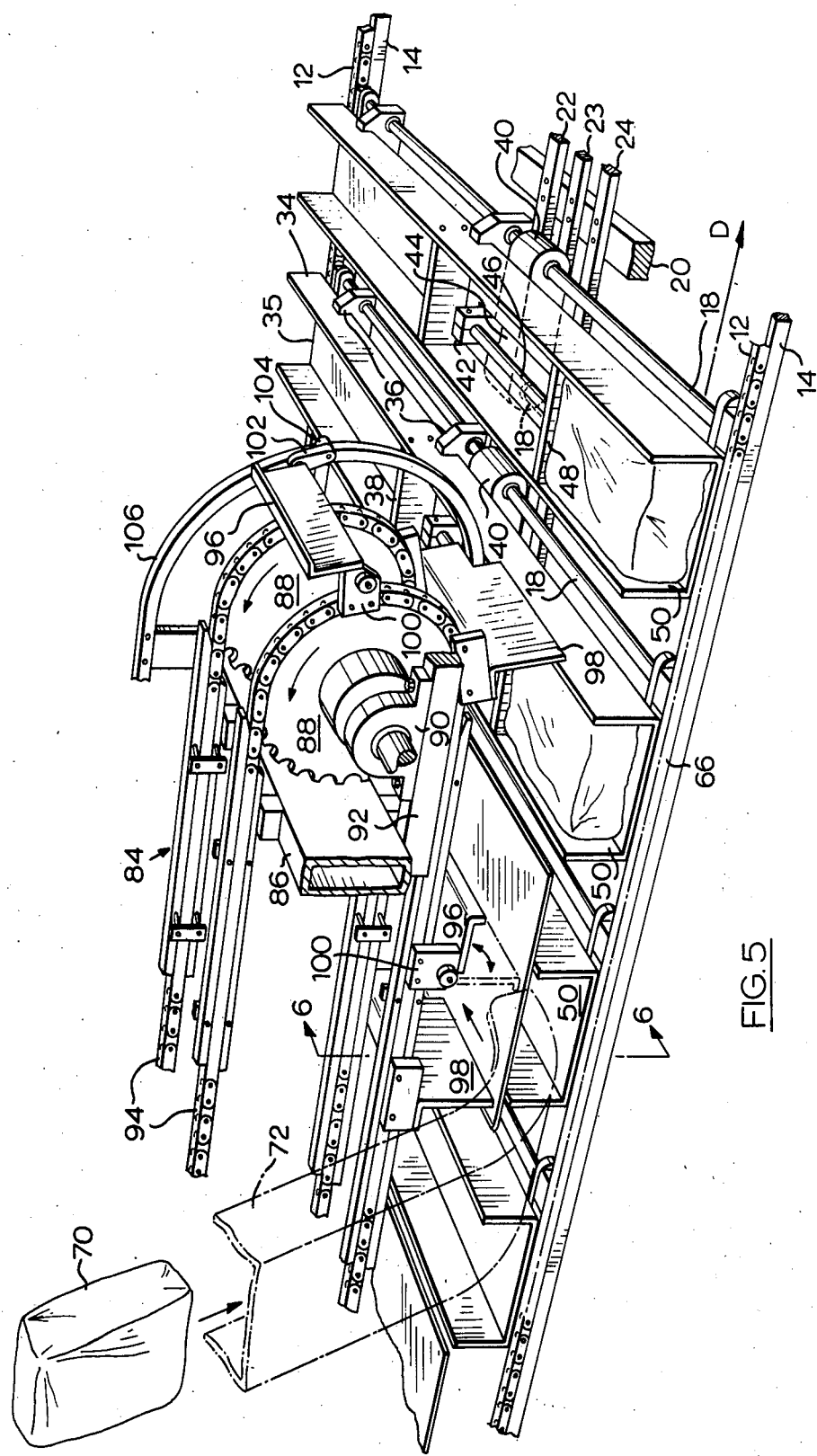
FIG. 5 is a partially sectioned pictorial view illustrating the article loading station.

With reference to FIG. 1 of the drawings, the reference numeral 10 refers generally to a first conveyor mechanism which as shown in FIG. 5 of the drawings includes a pair of spaced parallel endless chain members 12 supported by spaced parallel rails 14 which are carried by a suitable frame structure (not shown). The endless chains 12 extend around sprockets (not shown) carried by shafts 16 at opposite ends of the conveyor and a suitable drive mechanism (not shown) is provided for driving one or other of the drive shafts 16 so as to move the chains 12 longitudinally of the rails 14 in the direction of the arrow D. The conveyor assembly includes a plurality of sets of transverse shafts 18 which are secured at opposite ends to the chains 12. Transverse frame support members 20 support guide rails 22, 23, 24, 25, 26, (FIGS. 3, 4, 5) which define guide tracks 28, 30 and 32. A plurality of article receiving compartment forming members 34, each of which consists of a substantially U-shaped sheet metal trough, are slidably mounted on shafts 18 by means of mounting brackets 36 which are arranged one substantially centrally of the length of the trough and the other adjacent the rear end of the trough. A transverse bracing plate 38 is secured substantially centrally of the length of the trough. This U-shaped trough construction which is of substantial length has been found to provide a member which, while light in weight, is sufficiently strong and rigid when one end is extended over the edge of the conveyor to act as a wrapping former. The U-shaped trough structure derives a substantial portion of its structural strength from the fact that it is of a length which is substantially greater than the length actually required in order to accommodate the article which is to be packaged, and by reason of the mounting of the trough on the two spaced transverse support shafts 18, the entire article receiving compartment forming member 34 is capable of withstanding repeated encounters with a blank in the wrapping operation without damage to the compartment forming members and the mechanism which provides the lateral movement thereof.

A bracket 40 is slidably mounted on each pair of transverse shafts 18 and has a leg portion 42 which projects through a longitudinal slot 44 formed in the bottom wall of the U-shaped trough member. The bracket 40 is slidable with respect to the shafts 18 independently of the brackets 36. A shaft 46 has one end adjustably clamped in the upstanding leg 42 and has a plate 48 located at the other end thereof. The location of the plate 48 with respect to the upstanding leg 42 is adjustable so as to vary the size of the article receiving compartment 50 formed within each U-shaped trough when the end plate 48 is in the retracted position shown in FIG. 5. The substantially centrally located support bracket 36 which supports the U-shaped trough member 35 is provided with a track follower roller 52 which extends into and runs along the track 28. A guide track follower roller 54 is secured to and disposed below the bracket 40 which supports the dispenser mechanism. The roller 54 is movable along the guide track 31 or selectively along guide tracks 30 and 32 as required. The mechanism for guiding the follower rollers 54 selectively along guide tracks 30 or 32 is diagrammatically illustrated in FIGS. 3 and 4 of the drawings and includes a switch plte 56 which is pivotally mounted at one end on the guide rail 24. The switch plate 56 is connected to the arm of a hydraulic cylinder 58 by means of an arm 60. The hydraulic cylinder 58 is adapted to move the switch plate between the position shown in FIGS. 3 and 4 of the drawings as required in use to guide the roller follower 54 along tracks 30 or 32 as required.

As shown in FIG. 2 and as will be described in more detail hereinafter, an electric eye sensing unit 62 is located towards the discharge end of the wrapping station. The sensing device 62, which is preferably in the form of an electric eye unit detects whether or not a carton has been properly located prior to the discharge of the article from the article receiving compartment 50. If the sensing device detects the presence of a wrapper, the hydraulic cylinder 58 is operated to position the switch plate such that the roller 54 is guided along the track 32. As shown in FIG. 1 of the drawings, this has the effect of causing relative movement between the ejection mechanism and the U-shaped trough. In following the path of the guide track 28, the U-shaped trough member is withdrawn from the wrapping station while the end plate 48 remains in the advanced position to retain the article in the wrapping station until the U-shaped trough member has been completely withdrawn from the package which is formed in the wrapping station. If the detection unit 62 detects the absence of a wrapper during the passage of the trough member through the detection point, the hydraulic cylinder 58 will be activated to move the switch plate 56 to the position shown in FIG. 4 of the drawings which will substantially prevent relative movement between the ejection mechanism and the U-shaped trough with the result that the article which is located within the U-shaped trough is withdrawn from the wrapping station with the U-shaped trough so that it is not discharged along with the correctly packaged articles. The article which is withdrawn for lack of a wrapper may be deposited in a suitable receptacle underlying the end of the conveyor 10 simply by permitting the article to drop freely out of the article receiving compartment when the compartment is inverted at the end of the conveyor. This structure eliminates the need to provide for the manual sorting of the packaged and unpackaged products discharged from the packaging machine. Previously it has been necessary to provide an operator at the output end of a high speed machine of this type to ensure that packages which are not properly loaded into containers are not loaded into larger containers for shipping along with properly packaged articles.

It is also important to ensure that cartons are not loaded for shipping which do not contain the article which is to be packaged. It will be understood that in a high speed machine for packaging relatively lightweight articles such as snack foods, it may be quite difficult to tell whether a sealed package contains the required product or not. This difficulty is overcome in the present invention by providing a detection unit 64 which may be in the form of an electric eye unit similar to the unit employed for detecting the presence of a wrapper. By reason of the fact that the U-shaped trough members 35 are open at the end which is disposed towards the marginal edge 66 of the conveyor, it is possible to locate the detection device so that it operates in a plane which extends through a portion of the space which is normally occupied by the article which is to be wrapped. The sensing device 64 controls the operation of the stripper and transfer mechanism, as will be described hereinafter, so that if an empty article receiving compartment is detected, the stripper device does not operate so that the empty trough member is permitted to pass through the wrapping station without having a blank wrapped thereabout.

In the loading station A, articles such as packages 70 are loaded into the article receiving compartments 50 of each trough member. In order to permit the apparatus of the present invention to operate at high speed, a plurality of loading chutes 72 are provided in the loading station A. Each of the loading chutes 72 may be fed from an escalator device which elevates the packages 70 so that the packages 70 slide down the chutes 72 under the influence of gravity. A loading platform 74 (FIG. 5a) is carried by a frame member 76 in a position supported above the level of the upper edges of the U-shaped trough members. A stop wall 78 is mounted on the ends of support shafts 80 which are slidably mounted in the frame member 76. Locking screws 82 are adapted to secure the stop wall 78 in any required position with respect to the platform 74.

A loading conveyor assembly 84 is located above the loading platform 74 and supported by means of frame members 86. A pair of sprockets 88 are mounted for rotation in bearings 90 which are carried by frame members 92 which are supported by the frame member 86. Endless chains 94 extend around the sprockets 88 and a plurality of sets of wiper blades 96 and 98 are mounted at spaced intervals along the chains 94. The wiper blades 98 are permanently located in a fixed position projecting normal to the chain. The wiper blades 96 are pivotably mounted on brackets 100 which extend outwardly from the chains 94. A lever arm 102 is secured to each of the wiper blades 96 and projects outwardly therefrom. A cam track follower roller 104 is mounted at the outer end of the lever arm 102. A cam track 106 extends through the loading station and upwardly around the end of the path of the loading conveyor. In the immediate area in which the wiper blades engage the packaged article, the cam track 106 has a raised portion 108. A secondary cam track portion 110 extends in an underlying spaced relationship to the raised portion 108 over a major portion of its length (FIGS. 6, 7, 8). In use, the cam track 108 normally serves to retain the leading wiper blade 96 in the raised position shown in FIG. 6 of the drawings. When the leading wiper blade 96 is in this position, it is free to pass over the article 70 which is located on the platform 74 when driven in the direction of the arrow E by means of chains 94. After the leading wiper blade 96 has cleared the package 70, the roller 104 is guided along the guide track 112 formed between guide rails 108 and 110. This causes the leading wiper blade 96 to pivot downwardly into the position shown in FIG. 7 of the drawings. It will be noted that a short lug 114 is formed at the lower edge of the leading wiper blade 96 and that this lug serves to support the forward edge of the package as it is moved over the forward edge of the support platform 74 so that it does not immediately drop off of the forward edge of the platfrom 74. It will be noted that by the time the leading wiper blade 96 has been pivoted downwardly to a position shown in FIG. 7, the trailing wiper blade 98 has engaged the article 70 and moved it a substantial distance in the direction of the arrow E across the platform 74. Further movement of the wiper blades in the direction of the arrow causes the leading wiper blade 96 to be moved away from the article 70, thereby releasing the article 70 so that it falls into the article receiving compartment 50.

Figure 9:
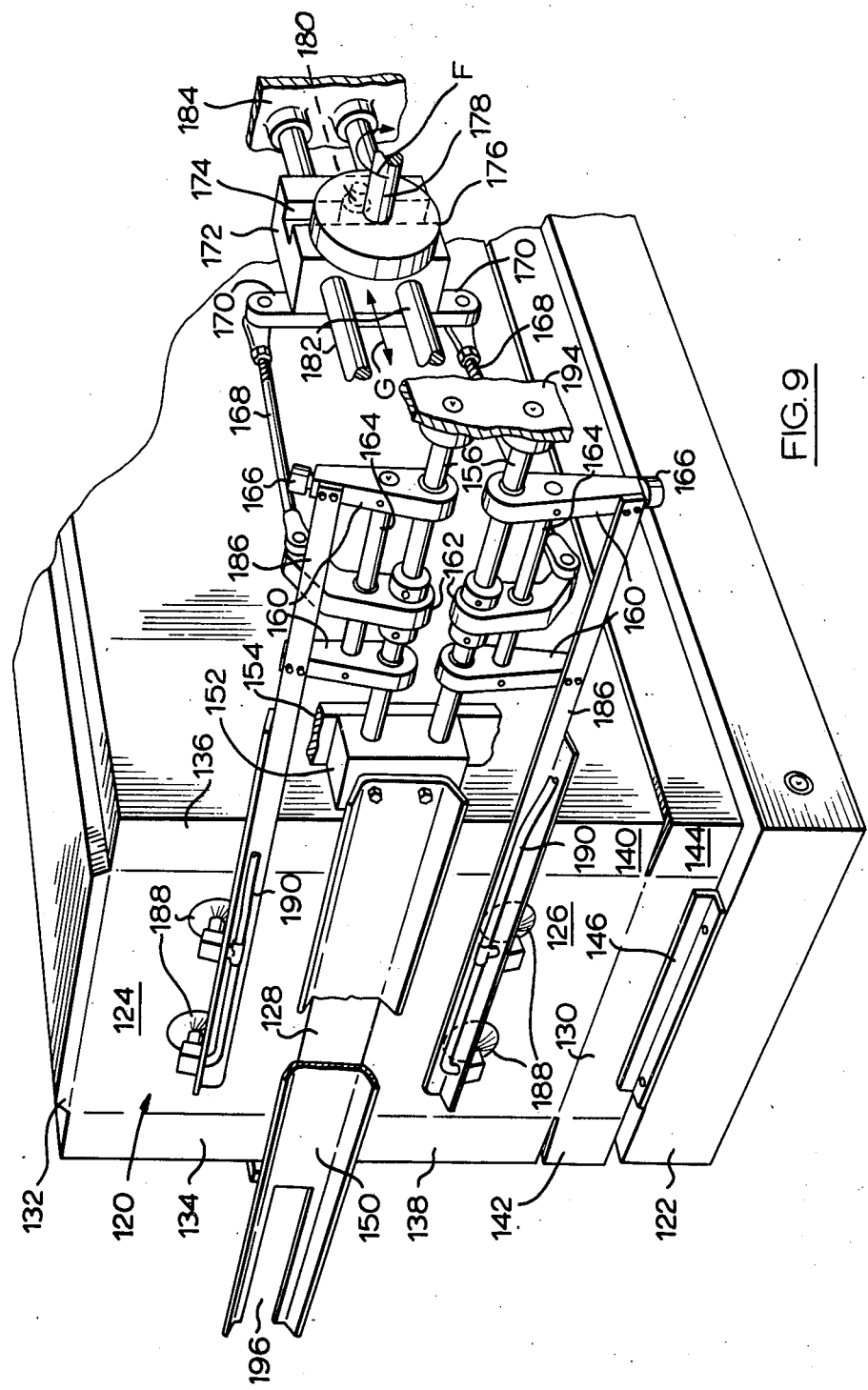
FIG. 9 is a partially sectioned pictorial view of the stripper mechanism for stripping carton blanks from a dispenser.

A plurality of knocked down carton blanks 120 are mounted in a face to face upright stacked configuration in a blank magazine support device 122 which is located in the storage station C. Each of the blanks 120 includes a top wall panel 124 and a bottom wall panel 126 which are connected to one another by means of a side wall panel 128. A side wall flap 130 is connected to the other edge of the bottom wall panel 126 and a side wall panel 132 is connected to the top wall panel 124. End closure flaps 134, 136, 138, 140 project outwardly from the ends of panels 124, 126 respectively. End flaps 142, 144 project outwardly from opposite ends of the side wall flap 130. The magazine has a retainer blade 146 at the lower edge thereof together with additional retainer blades (not shown) which serve to prevent the leading carton being discharged wihtout control from the carton magazine. An initial bending former 150 is mounted on a support block 152 which is in turn mounted on a frame member 154 so that the former 150 is held in a position spaced forwardly from and aligned with the side wall panel 128 of the leading blank. The initial bending former 150 has short side walls which project outwardly from the base wall of the former. The side walls diverge in the direction of the plane into which the top and bottom panels 124, 126 are initially bent. The bending mechanism consists of a pair of stationary shafts 156 which are mounted on frame member 194 and the support block 152. Rocker arms 160 are pivotably and slidably mounted on the shafts 156. Rocker arms 162 are pivotably mounted on the shafts 156. The rocker arms 162 are secured against lateral movement along the shafts 156. The rocker arms 162 are secured to their adjacent rocker arms 160 by means of shafts 164 which are slidably mounted with respect to the rocker arms 162 and rigidly mounted with respect to rocker arms 160. A small cam roller 166 is located at the outer end of the outer rocker arms 160 of each set of rocker arms. The outer ends of the rocker arms 162 are secured by means of shafts 168 to opposite ends of a support plate 170. The support plate 170 is carried by support block 172 which has a vertical slot 174 formed therein. A drive wheel 176 is mounted on a shaft 178 which is rotatably driven in the direction of the arrow F. An eccentrically mounted drive pin 180 projects from the drive wheel 176 into the slot 174 in the block 172 so that as the drive wheel 176 rotates in the direction of the arrow F, the block 172 is reciprocally driven (arrow G) with respect to guide shafts 182 which are supported by a further frame member 184. Blade members 186 are secured to the ends of the rocker arms 160 and project laterally therefrom into a position overlying the outer end of the leading carton of the magazine. Suction cups 183 are mounted on the ends of the blades 186. The suction cups 188 are connected to a suitable vacuum source by means of conduits 190. The reciprocal movement of the block 172 in response to rotation of the drive wheel 176 causes the blades 186 to move to and fro between the forward position illustrated in FIG. 9 of the drawings and the folded position illustrated in FIG. 10 of the drawings. When the suction cups 188 are located in the position shown in FIG. 9 of the drawings, a vacuum is applied to the suction cups so that they engage the leading blank and retain their engagement with the leading blank during movement from the position shown in FIG. 9 of the position shown in FIG. 10 to effect an initial bending of the blank about the former 150. The guide tracks 192 guide the rollers 166 in a path which extends laterally of the direction of rotation of the rocker arms 160 such that after the carton blank has been engaged and the panels 124 and 126 are initially drawn away from the blank magazine, the carton is thereafter moved laterally of the initial folding former 150 by means of the lateral movement of the rocker arms 160 in response to the movement of the roller 166 along the cam track 192. This lateral movement causes the blank 120 to move laterally of the former 150 so that a portion of the blank overlies the opening 196 formed in the outer end of the former 150.

A lateral drive mechanism 200 (FIG. 11) is positioned so as to drive the partially folded blank laterally from the initial lateral provided by the initial folding mechanism into the wrapping station. The lateral drive mechanism 200 includes two sets of drive rollers 202 which are mounted on drive shafts 204 which are rotatably driven in the direction of the arrow H. The rollers 202 are located rearwardly of the passage 196 formed in the initial bending former 150. A second set of rollers 206 are mounted in the end of a shaft 208 which is reciprocally driven by means of a solenoid 210. The rollers 206 cooperate with the rollers 202 to drivingly engage a blank when the rollers 206 are in the forward position. The rollers 206 are withdrawn by means of the solenoid 210 to provide for the free movement of the blank into the position disposed between the rollers during the initial lateral movement of the blank by means of the initial bending mechanism.

A pair of guide rails 212 are supported by the frame (not shown) in a position so as to be disposed laterally and outwardly from the walls of the blank when the blank is in the initial folded position. The rails 212 serve to retain the blank in the folded position after the suction cups 188 are released. An adhesive applicator gun 214 is positioned so as to apply adhesive to a narrow band 216 on the side flap 130 as the blank is moved laterally to the wrapping station.

Figure 12:
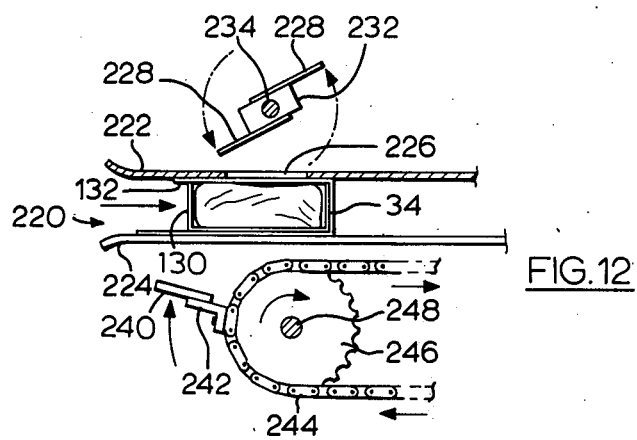
FIG. 12 shows a further stage in the wrapping operation.
Figure 13:
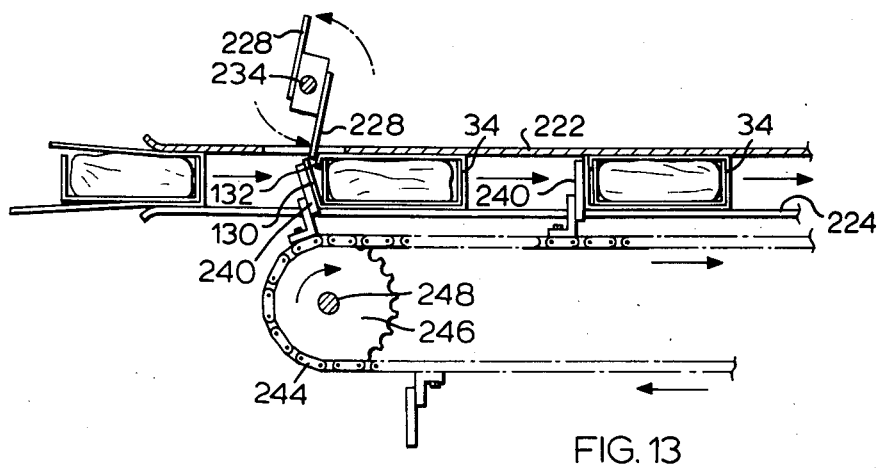
FIG. 13 shows a still further stage in the wrapping operation.

When the partially folded blank is located within the wrapping station B in the path of travel of the article receiving compartment forming members 34, the side wall 128 of the blank is engaged by the leading side wall of a member 34 and is carried thereby into the mouth 220 (FIG. 12) formed between upper folding plate 222 and lower folding rails 224. The plate 222 and rails 224 serve to wrap the blank about three sides of the member 34. An opening 226 is formed in the upper plate 222 through which the blades 228 of the upper flap closure device 230 pass in use. The blades 228 are mounted on a support block 232 which is rotatably mounted on shaft 234 which is carried by the frame (not shown) and rotatably driven by a suitable drive mechanism such that the rotation of the blades 228 is synchronized with respect to the passage of the members 34 past the opening 226. As the member 34 passes through the opening 226, one of the blades 228 engages the flap 132 and folds it around the trailing side wall of the member 34 as shown in FIG. 13 of the drawings. The end flap 130 is folded upwardly into an outwardly overlying relationship with respect to the flap 132 by means of blade members 240 which are mounted on brackets 242 carried by endless chains 244. The endless chains 244 are driven by sprockets 246 which are in turn driven by a suitable drive means (not shown) through a drive shaft 248. The movement of the blade members 240 is synchronized with respect to the movement of the members 34 so as to achieve the folding of the flap 130 after the folding of the flap 132. After the folding has been completed, the plate 240 serves to hold the flaps 130 and 132 in intimate engagement with one another for a period of time sufficient to permit the adhesive to effectively secure the flaps together. The plates 240 also serve the purpose of pushing the cartons along the conveyor after the member 34 is withdrawn as will be described hereinafter.

Figure 14:
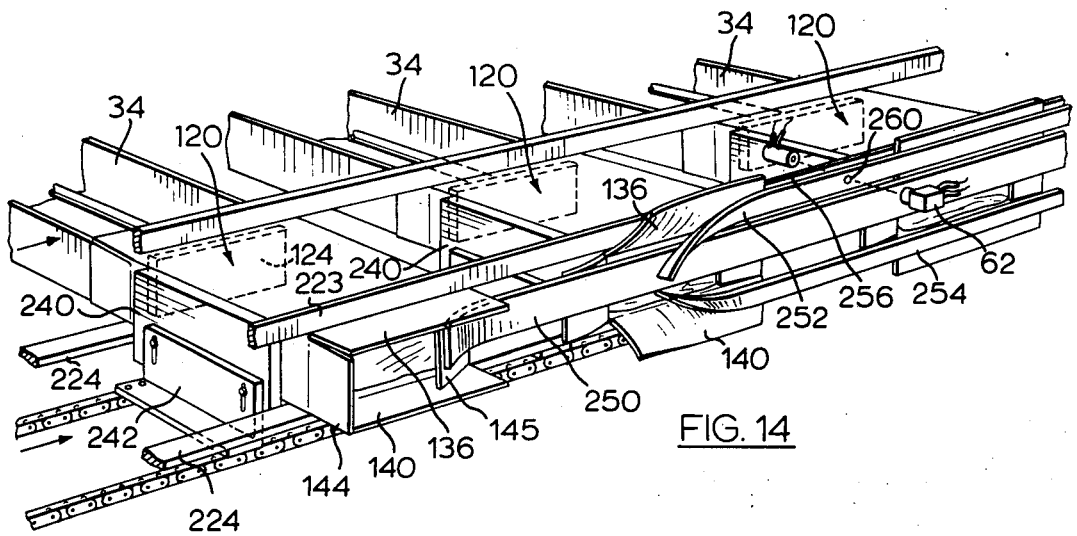
FIG. 14 is a pictorial view illustrating the manner in which the end flaps of a carton are secured for removal from the article receiving compartment.

A pair of top guide rails 223 extend rearwardly from the plate 222 and serve the same purpose as the plate 222 in that they retain the top panel 124 of the blank in intimate contact with the member 34. As shown in FIG. 14 of the drawings, the end flaps 136, 140, 144 and 145 project outwardly from the sleeve configuration of the blank formed in the wrapping operation. In order to ensure that a wrapper is in fact located about the article receiving compartment, the flap 145 is folded inwardly of the flaps 136, 140 by means of a guide bar 250 and subsequently the flaps 136, 140 are folded outwardly by means of guide rails 252, 254. The guide rail 252 folds the flap 136 outwardly into a position wherein it passes along a slot 256 formed between the guide rail 252 and an adjacent guide rail 223. The electric eye device 62 is aligned with a passage 260 which opens through rails 252 and 223. If the carton flap 136 is not sensed by the electric eye device as the member 34 moves through the wrapping station, the switch plate 56 will be moved to a position to guide the roller 54 along the track 30 as shown in FIG. 2 of the drawings so that the unwrapped article will not be dispensed from the member 34. If, on the other hand, an end flap 136 is detected by the electric eye device 62, the switch plate 56 will be located in the position shown in FIG. 3 of the drawings so that the roller 54 will follow the guide track 32 and the discharge mechanism will operate to discharge the article from the member 34 as the member 34 is withdrawn as shown in FIG. 1 of the drawings.

Figure 15:
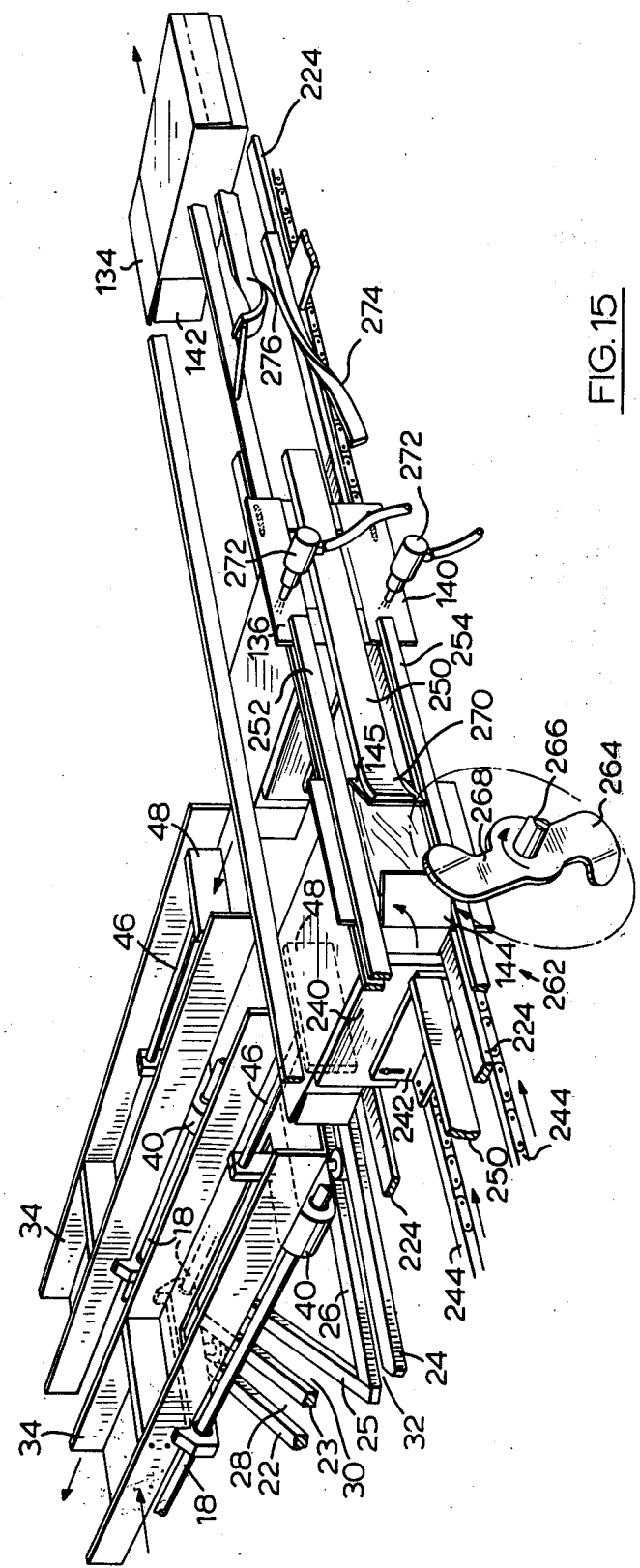
FIG. 15 is pictorial view illustrating the mechanism for closing the end flaps at one end of the carton.

As the partially formed carton moves along the rails 224, the open outer end is loated in an end closure station 262 (FIG. 15) which is located at the gap in the end rail 250. As a result of the resilience of the end flaps 144, the flaps will recover their outwardly directed position after the carton moves the gap formed in the rail 250 at the end closure station. A rotary blade 264 is rotatably driven by a shaft 266. The blade 264 has opposed arms 268 which, on rotation of the shaft 266, engage the flaps 144 and fold them inwardly. As the cartons are advanced along the rails 224 by means of the blades 240, the flap 144 is held in the inwardly folded position by the blade 264 for a sufficient period of time to permit the flap to be located in an underlying relationship with respect to the lip portion 270 of the end rail 250. The lip portion 270 of the end rail 250 serves to fold the end flap 145 inwardly of the carton.

A pair of adhesive applicator guns 272 are located at the discharge end of the guide rails 252, 254 and apply adhesive to the end flaps 136, 140 as a package is moved along the rails 224. The end flaps 140 and 136 are then folded to a closed position by means of curved guide rails 274, 276. The guide rails 274, 276 fold the flaps 136, 140 upon one another and serve to hold the flaps in the folded position for a time sufficient to permit the adhesive to firmly secure the flaps in the closed position. The flaps 134, 138, 142 on the other end of the carton are closed in a similar manner by a similar rotary blade 265 (FIG. 1) and adhesive applicator guns 273 and suitable folding rails (not shown).

In use, the apparatus of the present invention provides for a high speed loading of articles into the article receiving compartments, the high speed wrapping of the article receiving compartments which form substantially rigid forming mandrels, and an efficient stripper mechanism for stripping a knocked down carton blank from a carton storage station and delivering the blank into the wrapping station.

Figure 10:
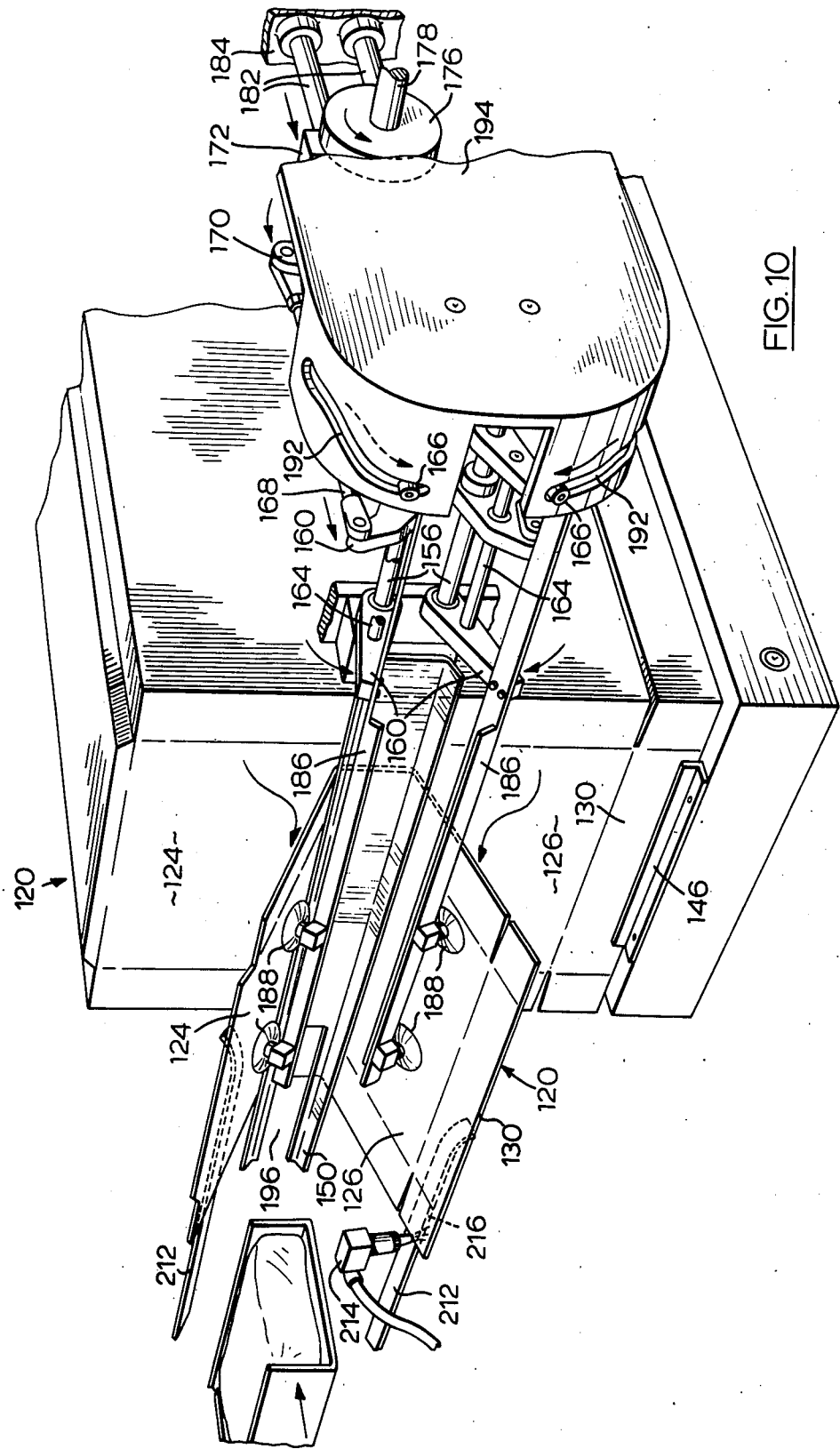
FIG. 10 is a view similar to FIG. 9 showing the stripper mechanism in a second position.
Figure 11:
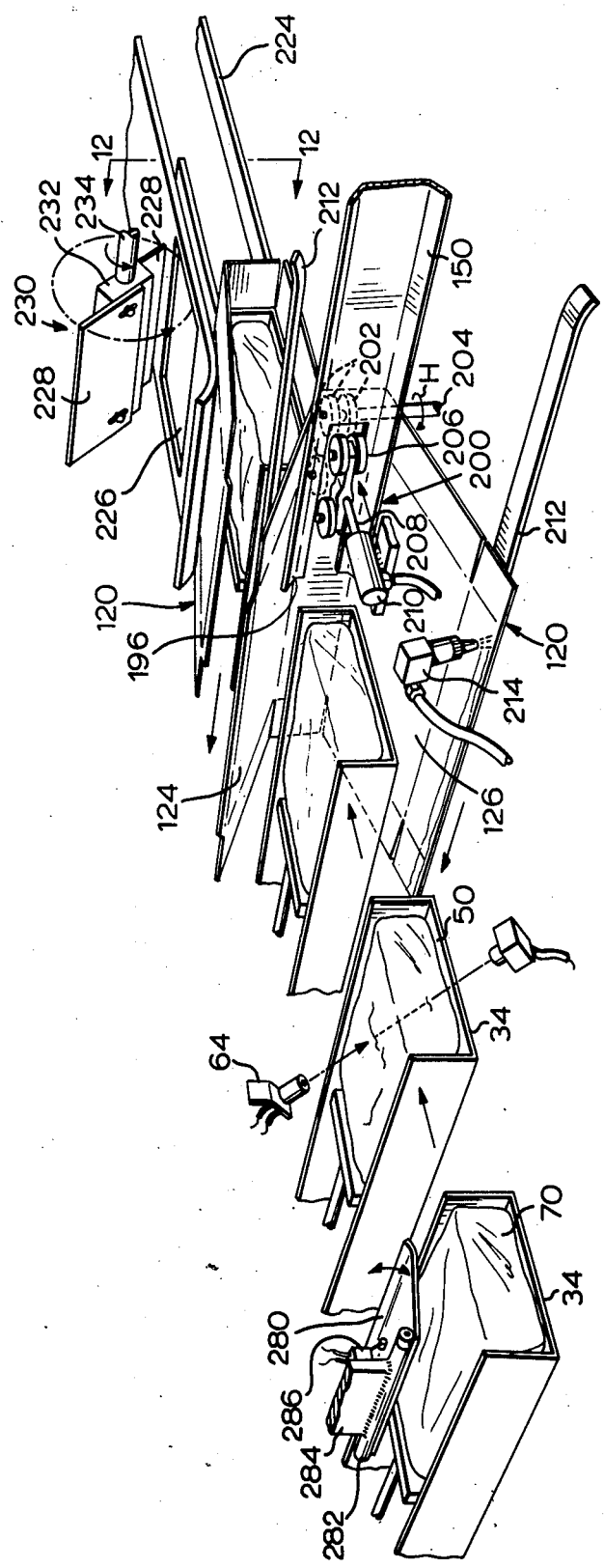
FIG. 11 is a partial pictorial view illustrating the location of the partially folded blank in the wrapping path of the article receiving compartments.

In use, the article 70 is loaded by means of one or more loading chutes 72 onto one or more loading platforms. The wiper blades 96, 98 move the article across the platform and deposit it into the article receiving compartment 50 formed in the trough-shaped member 34. The members 34 are moved out of the loading station by means of the conveyor on which they are supported. The trough device 34 and its associated article discharge mechanism and the article 70 are moved laterally of the first conveyor by means of the guide tracks 28 and 31. In order to ensure that the articles are properly seated in the article receiving compartments, a sensor plate 280 (FIG. 11) is located in the path of the trough members 34. The sensor plate 280 is pivotally mounted on a shaft 282 which is supported by frame member 284. A microswitch 286 is mounted on the frame 284 so as to be activated when the sensor plate 280 is elevated by an improperly located article 70 to stop the movement of the first conveyor before the improperly located package reaches the wrapping position. If the microswitch 286 is not activated, the continuous movement of the first conveyor is not interrupted and the trough moves to the package detection station wherein the electric eye device 64 serves to determine whether or not a package 70 is located within the article receiving compartment 50 as previously described. If the article receiving compartment is found to be empty, the stripper mechanism is not activated and the trough member 34 and its contents are permitted to pass through the wrapping station without forming a carton about the trough member 34. If the presence of an article 70 is detected by the electric eye device 64, the stripper mechanism is activated as previously described to discharge a partially folded blank into the path of the trough member 34 as shown in FIGS. 1, 10 and 11 of the drawings. The blank is then shaped to the form of a sleeve with the side flaps 132, 130 folded upon one another (FIGS. 12 and 13) and adhesively secured to one another by the adhesive applied by the adhesive applicator 214 and held securely by a plate 240 mounted on the chains 244. As the first conveyor continues to advance through the wrapping station, the end flap 136 is folded upwardly and passes the second electric eye device 62. When the second electric eye device 62 detects the presence of an upwardly turned end flap 136, it transmits a signal to the switching mechanism which controls the operation of the switch plate 56 and the switch plate 56 is thereby located in a position to guide the roller 54 along guide path 32 as shown in FIGS. 1 and 3 of the drawings. If the electric eye device 62 is not activated indicating the absence of an end flap 136, the switch plate 156 is moved to the position shown in FIG. 4 of the drawings which causes the roller 54 to follow the guide path 30 as shown in FIG. 2 of the drawings. When the roller 54 is guided along guide path 32, the trough member 34 is moved laterally relative to the dispenser mechanism so that the dispenser mechanism serves to retain the article within the container until the trough member 34 is withdrawn from the container and the article 70 rests on the bottom wall of the container. Thereafter, the dispenser mechanism moves laterally with respect to the trough member 34 to return to its position inwardly of the article receiving compartment in a position ready to receive a further article when returned to the loading station. The carton with the article located therein continues to the wrapping station and the end flaps at both ends are closed.

In order to ensure that the article 70 is located inwardly of the wrapper before the trough member is withdrawn, the guide path 32 includes an initial lateral jog portion 32a which provides a slight relative movement between the dispenser mechanism and the trough 34.

If, as previously described, the sensing mechanism 62 indicates that a wrapper has not been applied by reason of the action of the first sensing device 64 or a failure in the dispenser mechanism, the dispenser mechanism is withdrawn along with the U-shaped trough member (FIG. 2) so that if an article is located in the U-shaped trough, the article is not transferred onto the discharge conveyor so as to be mixed with the wrapped articles which are discharged from the discharge conveyor. The articles which are unwrapped are discharged at the end of the first conveyor and may be returned to the loading mechanism.

From the foregoing, it will be apparent that the present invention provides an apparatus which is capable of forming shipper packages from knocked carton blanks at high speed. The mechanism is such that it is rugged and does not employ any operating mechanism which require complex movements in order to load and form the shipper carton. These and other advantages of the device of the present invention will be apparent to those skilled in the art without departing from the scope of the invention.

What I claim as my invention is:

1. In a packaging machine having a first conveyor for conveying a plurality of longitudinally spaced apart article receiving compartments of a fixed size through a loading station to receive size variable articles, the improvement of;
   (a) said first conveyor having a loading run extending through said loading station in a first plane with said article receiving compartments opening upwardly therefrom; and
   (b) loading means comprising;
      (i) a loading platform disposed above said first conveyor and extending parallel to a portion of said loading run of said first conveyor in a second plane disposed to prevent slippage of said articles therealong due to gravitational forces applied to said articles, said loading platform having a discharge edge at one end thereof, the article receiving compartments moving forwardly from said discharge edge as they emerge from below said platform and travelling along said loading run, (ii) a second conveyor disposed above said platform and having a length extending in a third plane parallel to said first plane for movement in the direction of movement of the first conveyor, (iii) a plurality of wiper blade sets mounted at longitudinally spaced apart intervals on said second conveyor for movement with said second conveyor in the direction of the path of travel of said compartments through said loading station, the movement of the wiper blade sets being synchronized with the movement of the compartments so that each wiper blade set will open into a compartment as a compartment emerges from said discharge edge of said platform, each of said wiper blade sets comprising a leading wiper blade and a trailing wiper blade which extend downwardly towards said first conveyor during their movement in the direction of movement of said second conveyor through said loading station, each leading wiper blade being mounted for movement between a first elevated position in which it will pass over an article located on said loading platform and a second lowered position in which it extends downwardly in a face-to-face relationship with respect to its associated trailing wiper blade, (iv) a dispenser means for substantially randomly dispensing articles one at a time onto an article receiving portion of said loading platform such that an article may be dispensed onto said receiving portion at any time after the passage of a trailing wiper blade from said article receiving portion until the arrival of a subsequent trailing wiper blade at said article receiving portion of said loading platform, (v) actuator means for elevating and lowering each leading wiper blade as it passes through said loading station, said actuator means being adapted to elevate each leading wiper blade before it arrives at said article receiving portion of said platform, and maintaining it in said elevated position so that there is an unrestricted space between successive trailing wiper blades to admit an article to said receiving portion of said platform at any time after the passage of a trailing wiper blade beyond said article receiving portion of said platform such that precise synchronization of the dispensing of articles onto said platform and positioning of each set of wiper blades in relation to the article receiving portion of said loading platform is not required, said actuator means lowering each leading wiper blade to said lowered position after it passes over said article receiving portion of said loading platform to locate an article between said wiper blades, said actuator means also elevating said leading wiper blade after it passes the discharge edge of said loading platform to permit an article located between said wiper blades to drop into an underlying article receiving compartment of said first conveyor.

* * * * *